May 3, 1927.

E. G. DEYE ET AL 1,627,153

DEVICE FOR USE WITH ROUTING MILLS

Filed May 6, 1924 2 Sheets-Sheet 1

Inventors
ERWIN G. DEYE,
HERMAN F. HAVERBUSCH,
By Murray & Gugelter
Attorneys

Inventors
ERWIN G. DEYE,
HERMAN F. HAVERBUSCH,

Attorneys

Patented May 3, 1927.

1,627,153

UNITED STATES PATENT OFFICE.

ERWIN G. DEYE, OF NEWPORT, KENTUCKY, AND HERMAN F. HAVERBUSCH, OF CINCINNATI, OHIO.

DEVICE FOR USE WITH ROUTING MILLS.

Application filed May 6, 1924. Serial No. 711,489.

Our invention relates to devices for holding electrotype cylinders used in printing, during the routing of the curved electrotypes. No change is contemplated in the routing machine, but only in the means for holding or securing the electrotypes in position upon such routing mill.

An object of our invention is to provide a device that will readily adapt itself to curvatures of various electrotypes whereby to reduce the number of electrotype holding devices heretofore necessary because of the variations in curvature of the electrotypes.

Another object of our invention is to provide a simple and efficient device for the purpose stated.

These and other objects are attained by the means described herein and disclosed in the accompanying drawings, in which.

Figure 1:
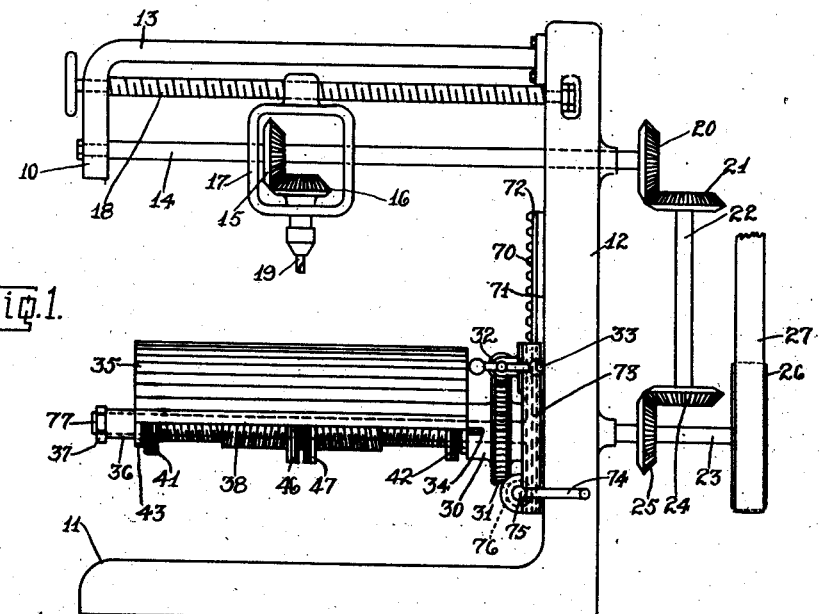
Fig. 1 is a fragmental elevation of a routing mill on which is mounted a device embodying our invention.

The routing mill 10 comprises a base 11, an upright 12 and an arm 13. A shaft 14 extends between the free end of the arm 13 and the upright 12 and carries a bevel gear 15 driving a bevel gear 16. A suitable housing 17 is provided for the reception of the bevel gears 15 and 16 and is engaged by an adjustment screw 18 whereby the housing 17 may be adjusted longitudinally of the shaft 14. The bevel gear 15 is splined to the shaft 14. A routing tool 19 is driven from the bevel gear 16 in any suitable manner. Shaft 14 is driven by means of bevel gears 20 and 2 from shaft 22. The shaft 22 is driven from shaft 23 by means of bevel gears 24 and 25. The shaft 23 may be driven from any suitable source and by any suitable means, for example a pulley 26 and belt 27. A rack 70 is mounted on a projection 71 carried by the upright 12. The projection 71 has a dovetail 72 formed on its front. A dove tailed slide 73 is carried by the projection 71. A lever 74 has mounted in it a shaft 75 carrying a pinion 76 which meshes with rack 70 for reciprocating the slide 73. The slide has mounted thereon a shaft 77, this shaft serves as a bearing for the carrier or table that is to receive the electrotype upon which tool 19 operates. The foregoing details are described herein solely for the purpose of explanation and may be varied in accordance with the general accepted practice.

The shaft 77 has revolubly mounted upon it, a collar 30 carrying a worm wheel 31 that may be rotatably actuated by means of a worm 32 controlled by a hand wheel 33. The collar 30 is provided with a slot 34. The carrier 35 is mounted upon the shaft 77 and is retained in position thereon by means of a collar or spacer 36 and a suitable nut 37 mounted upon the end of the shaft 77.

The carrier 35 comprises a tubular shaft 38 having formed thereon pairs of right and left hand threads. As shown herein the tube shaft in enlarged at its center, the central portion thereof being set off from the reduced end portions thereof by shoulders 39 and 40. The shoulders serve as abutments for limiting the inward movement of the threaded sleeves 41 and 42 mounted upon the ends of the tube shaft 38. Flanges 43 and 44 are formed at the extreme ends of the tube shaft. The flange 44 carries a lug 45 that may enter the slot 34 whereby to effect unitary movement of the carrier and the collar 30 by means of the hand wheel or crank 33. The flange 44 also serves as an abutment for engagement on the collar 30. The flange 43 serves as an abutment for the collar 36. The central an enlarged portion of the tube shaft 38 has mounted on it threaded sleeves 46 and 47. Each of the threaded sleeves 41, 42, 46 and 47 has pivotally mounted on it a plurality of links 48. The links 48 extending from sleeves 41 and 46 have pivotal mountings upon bars 49, a plurality of which bars extend concentrically about the tube shaft 38. Each bar 49 is also pivotally connected to a pair of links 48, and which links 48 extend from threaded sleeves 42 and 47. From the foregoing it will be evident that relative movement of the tube shaft 38 and of the threaded sleeves 41, 42, 46 and 47 will serve to expand and contract the several bars 49. The outer surfaces of the bars are provided with elongated dove tailed ways 50 adapted to receive dogs 51 that may extend over the edges of electrotypes 52 disposed upon the outer faces of the bars 49. The dogs are provided with set screws 53 for co-operation with the dogs in clamping the electrotypes upon the bars. Suitable set screws 54 are provided with each of the threaded sleeves for locking the threaded sleeves in various positions.

Each of the threaded sleeves comprises a hub portion 55 provided with radially extending lugs 56 that are spaced from one another for providing recesses for the reception of the ends of links 48. A ring 57 is provided with radially extending spaced lugs 58 adapted to register with the lugs 56, the recesses between adjacent lugs 58 registering with the recesses provided between lugs 56. The adjacent faces of the lugs 56 and 58 are provided with complementary grooves for the reception of wires 59 or the like for providing pivotal mountings on the sleeves for the links 48. Each of the hub portions of the sleeves are provided with threads for engagement by threaded locking rings 60 that are mounted upon the hubs and secure the rings 57 in engagement upon the lugs 56. The pivotal mountings of the links 48 upon the bars 49 may be effected in any suitable manner, for example by providing pairs of depending flanges 61 upon the inner face of the bars 49 and between which pairs of lugs suitable pins 62 may extend. The ends of the links 48 would be disposed between the flanges 61.

Figure 4:
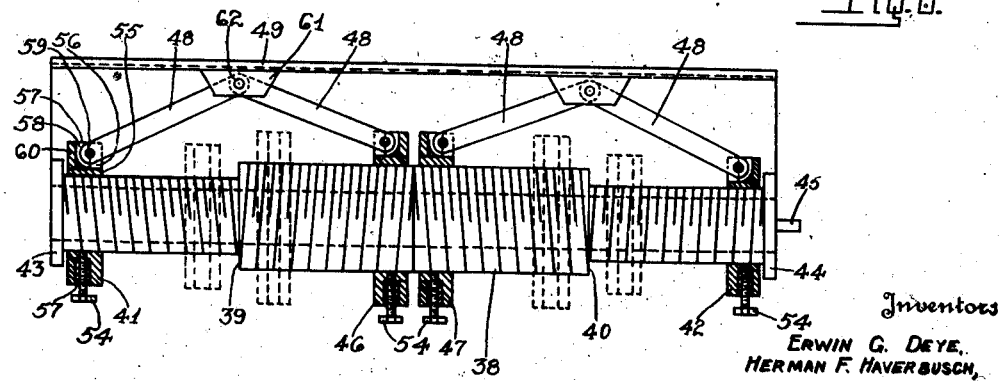
Fig. 4 is a sectional view on line 4—4 of Fig. 2.
Figure 5:
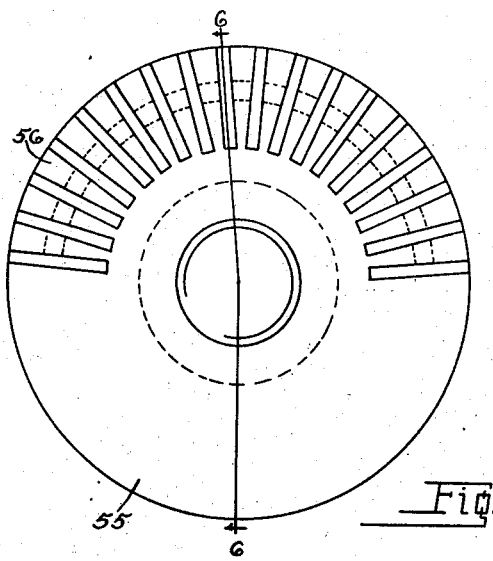
Fig. 5 is an elevation of a threaded sleeve forming a detail of our invention.
Figure 6:
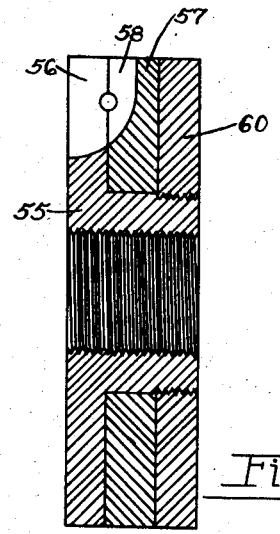
Fig. 6 is a sectional view on line 6—6 of Fig. 5.

In Fig. 4 the sleeves are shown in dotted line to indicate substantially the limits to which said sleeves may be brought together for expanding or extending the bars 49.

Figures 2, 3:
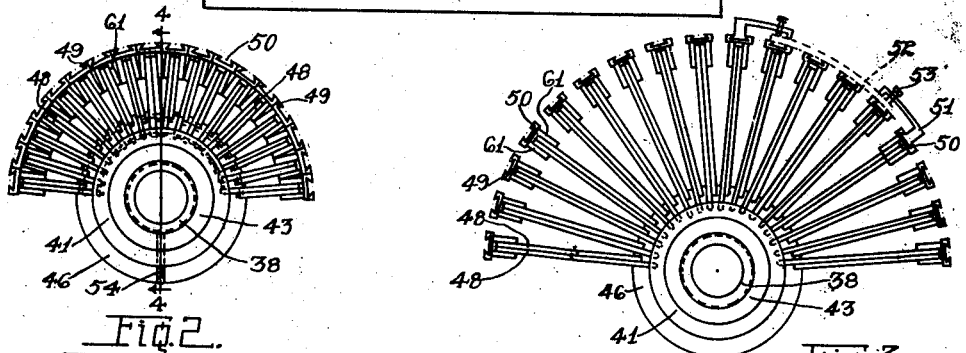
Fig. 2 is an end view of a device embodying our invention, showing the device in a contracted position.
Fig. 3 is an end view of the device shown in Fig. 2, the device being extended or expanded.

By reference to Figs. 2 and 3 it will be readily evident that by expanding and contracting the bars 49, the bars 49 may be moved to various radii. It therefore follows that electrotypes of various curvatures may be mounted upon any carrier that may be expanded or contracted within the limits established by the toggle structure effected by means of the links, threaded sleeves and tubular shaft. Electrotypes of various arcs may be accommodated by adjusting the dogs so as to dispose the dogs adjacent the edges of the electrotype whereupon the set screws 53 would be employed for clamping the electrotype upon the bars 49. After the electrotype is mounted upon the carrier, the carrier may be mounted upon the shaft 77 and may be secured to the sleeve 30 by means of the lug 45 and the slot 44 whereby to permit movement of the carrier through any desired arc. The bars 49 are locked in various adjusted positions by means of the set screws 54. The carrier may be left on the shaft 77 and may be adjusted while so mounted for accommodating various electrotypes.

What we claim is:

1. In a device of the class described the combination of a tube shaft having an enlarged central portion provided with right and left hand threads, the shaft being reduced outwardly of the enlarged portion thereof and being provided with right and left hand threads, the portions of the shaft having threads extending in a common direction being spaced by one of the portions of the shaft having threads extending in the opposite direction, a threaded sleeve mounted on each threaded portion of the shaft, links each having a pivotal mounting upon one of the sleeves, a plurality of bars extending in parallelism with the axis of the shaft, the links mounted on the sleeves disposed on adjacent enlarged and reduced portions of the shafts each having an end mounted pivotally upon individual bars in axial alignment, and each bar having a pivotal mounting upon a pair of links associated with each set of sleeves.

2. In a device of the class described the combination of a tube shaft having an enlarged central portion, the said central portion being provided with oppositely extending threads, the shaft portions extending from the said central portion being reduced and provided with threads extending in directions opposite to the threads on the adjacent enlarged portion, a pair of threaded sleeves associated with each enlarged and reduced portion of the shaft, pairs of links associated with each set of sleeves, one link of each pair having a mounting on one sleeve of one set and the other link having a pivotal mounting on the other sleeve of the same set, and bars each having a pivotal mounting on a pair of links associated with each set of sleeves, the links of each pair having aligned axes at their places of mounting upon the bars.

3. In a device of the class described the combination of a shaft provided with two sets of opposed right and left hand threads, the portions of the shaft having threads extending in a common direction being spaced by one of the portions of the shaft having threads extending in the opposite direction, a threaded sleeve mounted on each threaded portion of the shaft, links each having a pivotal mounting upon one of the sleeves, a plurality of bars extending in parallelism with the axis of the shaft, the links mounted on the sleeves at opposite ends of the shaft being paired and each link of each pair having an end mounted pivotally upon the same bar, and each bar having a pivotal mounting upon a pair of links associated with each set of sleeves.

4. In a device of the class described the combination of two sets of rings, each set of rings comprising a pair of rings, a shaft revoluble within the rings, the rings and shaft comprising complementary means for moving the rings longitudinally of the shaft by rotation of the shaft relative to the rings, the said complementary means adapted to simultaneously converge the rings of each set and to simultaneously separate the rings of each set of rings, dependent upon the direction of movement of the shaft relative to the rings, a plurality of pairs of links, each ring of each set being connected with its associated ring by a plurality of pairs of links, each link of each pair of links having an end pivotally connected to a ring of one set of rings, each link of each pair of links having its said pivotal mounting on a different ring of its associated pair of rings, and bars extending between the pairs of links connected with different sets of rings, each bar connecting a pair of links on one set of rings with one pair of links on the second set of rings, the links having pivotal mountings on the bars, the bars, links, rings and complementary means on the rings and shaft being so related that relative movement of the shaft and rings will move the bars in parallelism, toward and away from the shaft, determined by the direction of movement of the shaft relative to the rings.

5. In a device of the class described the combination of two sets of rings, each set of rings comprising a pair of rings, a shaft revoluble within the rings, the rings and shaft comprising complementary means for moving the rings longitudinally of the shaft by rotation of the shaft relative to the rings, the said complementary means adapted to simultaneously converge the rings of each set and to simultaneously separate the rings of each set of rings, dependent upon the direction of movement of the shaft relative to the rings, a plurality of pairs of links, each ring of each set being connected with its associated ring by a plurality of pairs of links, each link of each pair of links having an end pivotally connected to a ring of one set of rings, each link of each pair of links having its said pivotal mounting on a different ring of its associated pair of rings, and bars extending between the pairs of links connected with different sets of rings, each bar connecting a pair of links on one set of rings with one pair of links on the second set of rings, the links having pivotal mountings on the bars, the bars, links, rings and complementary means on the rings and shaft being so related that relative movement of the shaft and rings will move the bars in parallelism, toward and away from the shaft, determined by the direction of movement of the shaft relative to the rings, and means for detachably mounting an arcuate plate upon the bars, concentric with the bars and the shaft.

6. A table for holding arcuate electrotypes comprising a central support member, a plurality of bars extending in parallelism with one another and the axis of the support member, the bars being spaced equidistant from the center of the support member, means connecting the bars and the support member and movable along the support member for moving the bars in equidistant spaced relation toward and away from the support member axis and means attached to the bars for holding an arcuate electrotype upon the outer faces of selected bars.

In testimony whereof, we have hereunto subscribed our names this 26th day of April, 1924.

ERWIN G. DEYE.
HERMAN F. HAVERBUSCH.